United States Patent [19]
Evans

[11] Patent Number: 5,810,045
[45] Date of Patent: Sep. 22, 1998

[54] VALVE DEVICE FOR INTRODUCING PARTICULATE MATERIALS INTO A HIGH PRESSURE AIR STREAM

[75] Inventor: Martin Evans, Tolland, Conn.

[73] Assignee: Bulldog Technologies U.S.A., Inc., Wilmington, Del.

[21] Appl. No.: 768,104

[22] Filed: Dec. 16, 1996

[51] Int. Cl.⁶ .......................... F16K 31/124; B24C 7/00
[52] U.S. Cl. .................. 137/312; 251/63.5; 251/214; 451/99; 451/101
[58] Field of Search .................. 251/63, 63.5, 63.6, 251/214; 137/312; 73/40, 46; 451/99, 101

[56] References Cited

U.S. PATENT DOCUMENTS

| Re. 21,275 | 11/1939 | Pletcher | 451/101 |
|---|---|---|---|
| 3,074,600 | 1/1963 | Warhurst | 222/193 |
| 3,092,133 | 6/1963 | Clark | 137/220 |
| 3,476,440 | 11/1969 | Schmidt et al. | 302/53 |
| 3,573,200 | 3/1971 | Vogel | 208/173 |
| 4,075,789 | 2/1978 | Dremann | 51/436 |
| 4,534,139 | 8/1985 | Desjardins | 451/101 |
| 4,634,099 | 1/1987 | Danko et al. | 251/214 |
| 4,662,603 | 5/1987 | Etheridge | 251/63.5 |
| 4,687,017 | 8/1987 | Danko et al. | 251/63.5 |
| 4,735,021 | 4/1988 | Smith | 451/101 |
| 4,815,692 | 3/1989 | Loiseau et al. | 251/63.5 |
| 4,995,589 | 2/1991 | Adishian et al. | 251/63.5 |
| 5,097,633 | 3/1992 | Branton et al. | 51/165.71 |
| 5,215,286 | 6/1993 | Kolenc | 251/214 |
| 5,401,205 | 3/1995 | Shank, Jr. | 451/101 |
| 5,407,379 | 4/1995 | Shank et al. | 451/99 |

FOREIGN PATENT DOCUMENTS

| 1235093 | 2/1967 | Germany | 251/63.5 |
|---|---|---|---|
| 3019119 | 11/1981 | Germany | 251/63.5 |
| 1216701 | 12/1970 | United Kingdom | 251/63.5 |

*Primary Examiner*—George L. Walton
*Attorney, Agent, or Firm*—Dorr, Carson, Sloan & Birney, P.C.

[57] ABSTRACT

A valve for introducing particulate materials into a high pressure gas stream and for preventing said particulate materials from invading those interior regions of the valve having moving parts.

18 Claims, 4 Drawing Sheets

VALVE DEVICE FOR INTRODUCING PARTICULATE MATERIALS INTO A HIGH PRESSURE AIR STREAM

BACKGROUND OF THE INVENTION

1. Field of the Invention

This invention relates to valves for introducing particulate materials into high pressure air streams. Such valves are used for various purposes, such as: (1) introducing fluid catalytic cracking catalyst particles into those fluid catalytic cracking units (FCC units) used to crack and reform various petroleum-based products, (2) introducing particulate catalysts into other kinds of chemical processes, (3) entraining particles of sand into high pressure air streams in order to sandblast brick, stone and/or marble surfaces of buildings and (4) spraying particulate ingredients on adhesive substrates as part of various manufacturing process.

2. Description of the Prior Art

Valve devices for introducing particulate materials into high pressure air streams normally employ an air-driven, reciprocally moving, piston or plunger that pumps particulate material into a stream of high pressure air. The seals or O-rings on valves employing such reciprocatably moving parts come under a great deal of pressure and, hence, a great deal of stress. Such seals or O-rings are also often called upon to withstand pressure that is intermittently applied from opposite directions. For example, such seals or O-rings may have to withstand air pressure coming from one side of the piston when air pressure is applied to drive the piston and, thereafter, withstand air pressure from the opposite side of the piston when a high pressure stream of air is used to entrain the particulate material. In any event, failure of such seals or O-rings usually implies serious damage to valves of this kind. This follows from the fact that failure of those seals or O-rings that serve to keep abrasive materials such as catalyst particles, sand, etc., out of those regions of the valve having reciprocally moving parts, implies severe damage to those parts through abrasion and/or clogging.

In general, the prior art teaches that invasion of particulate materials into the interiors of such valves can be prevented through use of single seals or O-rings that are designed to primarily resist particle intrusion and/or air pressure that come from the same direction. For example, U.S. Pat. No. 3,476,440 teaches a sandblasting device having a valve element that is provided with an O-ring which is in sealing engagement with a guide portion of the body of the valve in order to prevent escape of air pressure around the valve element as well as to prevent invasion of particulate materials into certain interior regions of the valve that house moving parts. This device also employs a seal around its plunger element. This seal is situated above the sleeve and faces "downward" (i.e., it faces in the direction from which the particulate material would invade the interior of the valve). In other words, this seal is designed primarily to stop any leakage of particulate material into the piston chamber.

A piston is connected to, or is formed integrally with, the valve element, and it too has an O-ring or suitable packing that is in sealing engagement with the inside surface of a cylinder or chamber which is either integral with or connected to the body of the valve. The lower surface of the piston is driven by air pressure supplied from an air pressure source through an air flow tube by means of a connecting pressure tube so that air pressure supplied to the sandblasting apparatus also applies air pressure to the piston that opens the valve element. As the valve element is moved to the open position, it is resisted by a spring which thus provides the means for returning the valve element to its closed position when the air pressure on the piston is reduced or eliminated. If this O-ring fails, the particulate material being pumped will leak into the upper piston chamber. This particulate material would then mix with any lubricant in the upper piston chamber to form an extremely abrasive slurry. The presence of such an abrasive slurry in this chamber would cause the piston and piston chamber wall to be very quickly worn away.

U.S. Pat. No. 5,401,205 teaches a differential pressure metering and control valve system that includes a piston that is connected to, or is formed integrally with, a valve stem. The piston is threaded onto the valve stem and secured in place by a lock nut. The piston is placed in sealing engagement with the inside surface of a pneumatic chamber contained in a cylinder that is separate from the valve body. The lower surface of this piston is, by means of a connecting pressure supply tube, in fluid communication with air pressure supplied from the same air pressure source that feeds air to an air flow tube. Compressed air applied to an air flow tube is applied to the lower surface of the piston in order to move the piston, and, hence, the valve stem attached to it, upward and out of communication with the valve's particulate material flow passage.

U.S. Pat. No. 5,407,379 teaches a sandblast metering and control valve wherein a valve stem acts as an on-off valve which, when retracted, allows free passage of sand through a discharge tube and into an air flow tube. Conversely, when the valve is closed it will stop passage of the sand between the passage and discharge tube.

U.S. Pat. No. 4,534,139 teaches a sandblasting device whose material flow controlling ball valve is operated by a piston having a rod that is connected to a ball valve. The piston is housed in a cylinder having air passages that are in fluid communication with the interior of the cylinder on both sides of the piston.

U.S. Pat. No. 5,097,633 teaches sandblasting control apparatus having an electrically controlled valve for dispensing a sand/air blast. The apparatus includes a valve having a cylindrical casing within which a first piston is mounted for longitudinal movement. A second piston of smaller diameter is affixed to a rod in the center of the piston. The second piston moves independently within its cylinder. A side channel constitutes a connection to the outlet of a blast pot. The piston moves in a range of positions such that it blocks off the side channel.

U.S. Pat. No. 3,092,138 teaches a fluid regulating valve wherein a valve port sleeve and a central cylindrical housing form an annular chamber. At one end of this chamber, a series of ports are constructed which serve to provide conduits for fluid flow into an outlet chamber. Thus, a valving action is provided wherein the fluid will flow from an inlet chamber to the outlet chamber when the slide valve is open.

U.S. Pat. No. 3,074,600 teaches a powder spraying device that is operated when compressed air lifts a pilot valve and passes through a duct which, in conjunction with springs, causes pulsation of a diaphragm and reciprocating movement of a powder extracting plunger. Simultaneously, air intermittently flows along the duct and into a chamber and constricted region and then issues at high velocity from a nozzle. The air jet from the nozzle causes air to be drawn in through an inlet to form an air stream in which powder contained in grooves of a plunger is entrained when the latter is in projecting position. The powder thus extracted is discharged from an orifice with the air stream.

U.S. Pat. No. 3,573,200 teaches a catalyst addition system whose gravity feed loading pipe is further provided with a standpipe which receives catalyst from a loading pipe and conveys it into an essentially horizontal conduit that leads into a loading pipe at a point below a pre-existing loading valve in the loading pipe. The catalysts builds up in the horizontal conduit until it reaches an angle of repose that effectively causes a back pressure that is such that further flow of catalyst through the standpipe is prevented. Catalyst in the conduit is then blown into the loading pipe by means of motive gas that is controlled by a timer-operated solenoid valve.

U.S. Pat. No. 4,075,789 teaches an abrasive blast system having an abrasive flow control valve that is opened and closed by means of a plunger that is driven by air pressure placed on a diaphragm mounted on the plunger.

Thus, in virtually all of the above noted devices, failure of a piston or plunger seal usually implies entry of the particulate material into a region from which such particular material can not easily escape, and in which it will cause severe abrasion damage to a variety of moving parts. Consequently, any improvements in the sealing systems for those valves used to introduce particulate materials into high pressure air streams will serve to reduce this type of damage.

SUMMARY OF THE INVENTION

In response to these problems, applicant has developed an improved valve for introducing particulate materials into a high pressure stream of gas. This valve is particularly well suited to preventing damage to the valve by minimizing intrusion of the particulate material being pumped into certain internal regions of the valve. It can be used to introduce virtually any kind of particulate material into a stream of any kind of gas, e.g., air, nitrogen, hydrocarbon gas, etc. The hereindescribed valve is, however, especially useful for introducing hydrocarbon cracking catalyst particles and/or catalyst additive particles into FCC units. Regardless of its use, however, this valve is particularly characterized by its ability to prevent leakage of the particulate material being pumped by the valve into its metering piston chamber—and its ability to expel particulate that does find its way into this chamber. It accomplishes these results primarily through use of two distinct metering piston seals and a particulate material exhaust port that is generally located between these two seals.

Next, it should be noted that the herein described valve can be used to introduce particulate materials into a high pressure air stream according to predetermined schedules of introduction such as those employed to introduce FCC catalyst particles into a FCC unit, or they can be used to entrain such materials at a human operator's complete discretion on an "as needed" basis. For example, in the case of introducing catalyst particles into an FCC unit, the hereindescribed valves may be operated according to a predetermined catalyst addition schedule until and unless that predetermined schedule is: (1) automatically altered by a change in the unit's performance (e.g., a change in a FCC unit's performance with respect to an operating parameter such as, for example, an increase in $SO_x$ production, a change in riser temperature, etc., that is such that it will cause a computer program to introduce more or less of a given kind of catalyst through applicant's valve in order to correct the problem detected), (2) altered by an operator who actively preempts or intervenes in a scheduled catalyst addition program by, for example, keying new digital information into a computer that controls applicants' valve or (3) altered by an operator who intervenes into a given catalyst addition process by manually operating applicant's valve in order to meet an upset or emergency situation.

The most fundamental embodiment of applicant's valve will comprise:

(a) a valve body having (1) a drive piston chamber and a metering piston chamber that are separated by a chamber wall having an opening that permits reciprocal motion of a connecting device such as a connecting rod, bolt, etc., that rigidly connects a drive piston that is mounted in the drive piston chamber to a metering piston that is mounted in the metering piston chamber; (2) a particulate material flow passage through which particulate material moves from a particulate material storage vessel into a stream of high pressure gas, and (3) an "undesired" particulate material exhaust port that is located between a first metering piston seal and a second metering piston seal;

(b) a drive piston mounted for reciprocal movement within the drive piston chamber, said drive piston (1) having a seal for holding air pressure provided by a burst of high pressure air that forces said drive piston away from the chamber wall (and in one preferred embodiment, a seal for holding air pressure provided by a burst of high pressure air that forces said drive piston back toward the chamber wall), (2) a connecting rod attachment for rigidly connecting the drive piston to the connecting rod and (3) a rear surface adapted to receive a force that returns the drive piston toward the chamber wall (this force may be supplied by a burst of air or a force-producing mechanical device such as a spring);

(c) a metering piston mounted for reciprocal movement within (1) a metering piston sleeve, (2) a first metering piston seal and (3) a second metering piston seal, said metering piston having (1) a generally cylindrical body capable of reciprocally moving in the metering piston sleeve and in the first and second metering piston seals; (2) a front portion that is capable of blocking the particulate material flow passage when the metering piston is driven into said passage by an action provided (via the connecting rod) by the drive piston and (3) a rear end that is rigidly connected to the connecting rod;

(d) a metering piston sleeve having (1) a particulate material receiving port that leads to a sleeve bore in which the metering piston reciprocally moves and thereby driving particulate material that enters the receiving port into a stream of high pressure air flowing through a particle entrainment gas flow tube and (2) a sleeve bore in which the metering piston can reciprocally move;

(e) a first metering piston seal, having a front side that faces the burst of high pressure air delivered to the drive piston chamber in order to force the drive piston away from the chamber wall and a rear side that faces the metering piston; and (f) a second metering piston seal, having a front side that faces the particle entrainment gas flow tube, and a rear side that faces the chamber wall, said second metering piston seal being positioned in the metering piston chamber such that it forms a sealing relationship with the front end of the metering piston as said metering piston reciprocally moves with respect to said second metering piston seal, and thereby serving to prevent particulate material from entering those regions of the metering piston chamber located between the rear side of the second metering piston seal and the chamber wall.

This valve can be further provided with many other features and/or elements without departing from the general teachings and spirit of this patent disclosure. By way of example only, applicant's valve can be further provided with (1) at least one spring for forcing the drive piston "forward" (i.e., toward the chamber wall), (2) a second high pressure air inlet port in the drive piston chamber that is located "above" the drive piston (to the right of the top of the "rearward" stroke of the drive piston shown in FIG. 2) in order to introduce a burst of high pressure air that forces the drive piston back toward the chamber wall, (3) particulate material receiving port that is aligned substantially perpendicular to, and fluidly communicates with, the particle entrainment gas flow tube, (4) a source of high pressure air, that is used to both create the stream of high pressure air into which the particulate material is entrained and to create the high pressure air that forces the drive piston away from the chamber wall, (5) a first source of high pressure air that is used to create the stream of high pressure air into which the particulate material is entrained, and a second source of high pressure air that forces the drive piston away from the chamber wall, (6) a flushing fluid entry port for introducing a fluid such as a stream of pressured air or a stream of pressured liquid (e.g., oil, cleaning fluid, etc.) that is injected into a central portion of the metering piston chamber generally located between the first metering piston seal and the second metering piston seal in order to "flush out" any undesired particulate material that finds its way into said central portion of the metering piston chamber, (7) a first metering piston seal that is comprised of at least two seal components wherein a first seal component is adapted to resist pressure from air pressure injected into the drive piston chamber in order to force the drive piston away from the chamber wall, and a second seal component that is adapted to resist invasion of any undesired particulate materials that have found their way into the central portion of the metering piston chamber from entering into the drive piston chamber and (8) a second metering piston seal that is comprised of two seal components wherein a first seal component is adapted to resist pressure from the stream of high pressure air into which the particulate material is entrained, and a second seal component that is adapted to resist invasion of undesired particulate materials that have found their way into the central portion of the metering piston chamber into the bore of the metering piston sleeve. In another preferred embodiment of this invention, the first and second components of each of these seals are separated by a spacer that provides a solid backing for each of the two seal components of the first seal and of the second seal.

One of the most preferred embodiments of applicant's valve will comprise:

(a) a valve body having (1) a drive piston chamber and a metering piston chamber that are separated by a chamber wall having an opening for guiding a reciprocally moving connecting rod that rigidly connects a drive piston that is mounted for reciprocal movement in the drive piston chamber to a metering piston that is mounted for reciprocal movement in the metering piston chamber, (2) a particulate material receiving port for receiving particulate material into the metering piston chamber via a metering piston sleeve opening so that the metering piston will pump said particulate material into a stream of high pressure gas (e.g., air) that is flowing through a particle entrainment gas flow tube, (3) a particulate material exit port that is in fluid communication with both the particulate material receiving port through which the particulate material enters the valve body, and a particle entrainment gas flow tube that carries a stream of high pressure gas into which the metering piston pumps particulate material that enters the valve body through the particulate material receiving port, (4) a high pressure air receiving port for receiving a blast of high pressure air into the drive piston chamber in order to drive said piston away from the chamber wall with a force sufficient to overcome a counter force created by a spring that serves to force the drive piston back toward said chamber wall; and (5) an undesired particulate material exhaust port that is located between a first metering piston seal and a second metering piston seal;

(b) a drive piston that is mounted for reciprocal movement within the drive piston chamber, said drive piston having (1) a first drive piston seal for holding air pressure provided by a blast of high pressure air that enters the drive piston chamber through a high pressure air receiving port, (2) a rear surface that is adapted to receive force provided by biasing contact with a spring positioned between the drive piston and the inside of the top surface of the drive piston chamber in order to force the drive piston "forward" (i.e., toward the drive piston chamber wall), (3) a connector for rigidly connecting the drive piston to one end of a rigid connecting rod whose opposing end is connected to the rear end of the metering piston via the opening in the chamber wall that separates the metering piston chamber from the drive piston chamber, said opening and said connecting rod being so adapted and arranged that the connecting rod can reciprocally move in said opening in the chamber wall and thereby allowing the metering piston to be pulled away from the particulate material exit port when a blast of high pressure air is injected into the drive piston chamber and, conversely, allowing the metering piston to be driven toward the particulate material exit port by the biasing action of the spring in said drive piston chamber;

(c) a metering piston that is mounted for reciprocal movement within the metering piston sleeve and within a first metering piston seal and a second metering piston seal, said metering piston having (1) a generally cylindrical body that is capable of reciprocally moving in the metering piston sleeve and in the two seals in the metering piston chamber, (2) a front portion that is capable of preventing flow of the particulate material between the particulate material receiving port and the particulate material exit port when the metering piston is driven toward said exit port when the spring in the drive piston chamber (via the rigidly connected drive piston and connector rod) forces the metering piston into the particulate material exit port so that flow of the particulate material between the particulate material receiving port and the particulate material exit port is blocked by said metering piston, and, conversely, so that the metering piston is pulled away from said exit port when the high pressure air introduced into the drive piston chamber forces the drive piston away from the chamber wall and (3) a rear portion that is rigidly connected to the connecting rod;

(d) a metering piston sleeve mounted in the metering piston chamber such that the metering sleeve is positioned between the particulate material receiving port and the particulate material exit port through which the particulate material is pumped by the metering piston so that said particulate material is entrained into the stream of high pressure gas in the particle entrainment gas flow tube, said metering sleeve having (1) a bore in which the metering piston reciprocally moves and which defines a tolerance space between the bore and the metering piston, (2) a metering piston sleeve opening through which particulate material from the particulate material receiving port may enter the bore of the metering piston sleeve when said metering piston sleeve opening is opened by virtue of the fact that the metering piston is pulled "rearward," toward the chamber wall by the drive piston to an extent such that the metering piston does not block the metering piston sleeve opening, and (3) a bore that is sized such that metering piston that reciprocally moves in the metering sleeve bore forms a cooperating fit that is such that the metering piston can move within the metering sleeve bore, but also that is such that particulate material entering said bore can not enter a tolerance space between the bore of the metering sleeve and the outer surface of the metering piston, (e) a first metering piston seal having a front side that faces the burst of high pressure air delivered to the drive piston chamber and a rear side that faces the metering piston, said first seal being positioned in the chamber wall such that it forms a sealing relationship with the metering piston as said metering piston reciprocally moves with respect to said first seal, and thereby preventing air pressure in the drive piston chamber from entering into the metering piston chamber; and (f) a second metering piston seal having a front side that faces the high pressure gas tube into which the particulate material is entrained and a rear side that faces the chamber wall, said second seal being positioned in the metering piston chamber such that it forms a sealing relationship with the front portion of the metering piston as said metering piston reciprocally moves with respect to said second seal, and thereby serves to prevent particulate material from entering those regions of the metering piston chamber lying between the rear side of the second seal and the chamber wall.

DESCRIPTION OF PREFERRED EMBODIMENTS

Figure 1:
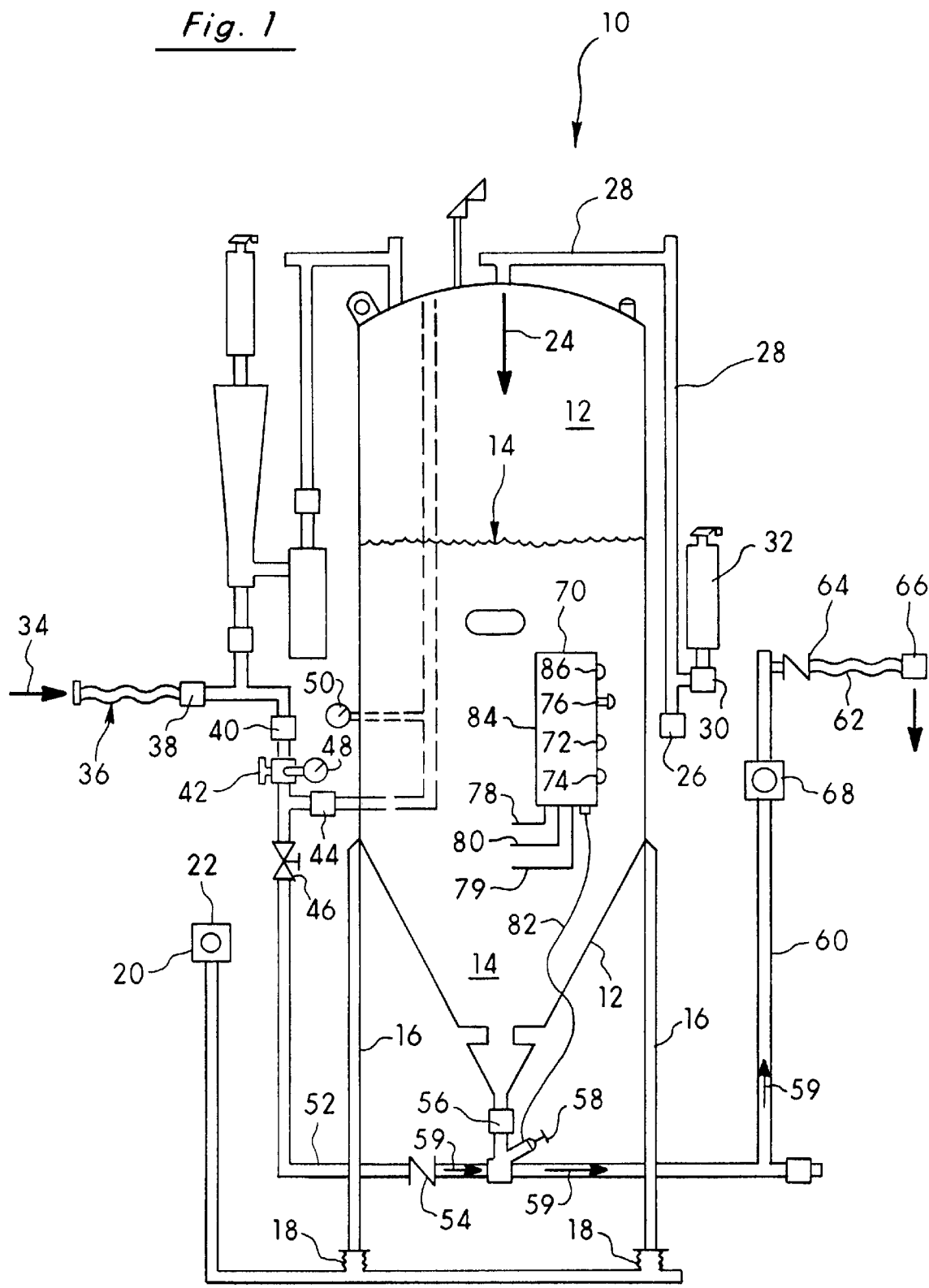
FIG. 1 depicts an FCC catalyst hopper that is equipped with a valve device made according to the teachings of this patent disclosure.

FIG. 1 depicts a catalyst addition apparatus 10 whose bottom is provided with a valve made according to the teachings of this patent disclosure. Again, such a valve may be used in a wide variety of devices whose duty is to introduce particulate materials into a stream of high pressure gas such as air, but a catalyst addition system is being used for illustrative purposes in this patent disclosure because catalyst addition through such a valve may be completely scheduled, partly scheduled and partly operator controlled, and/or completely operator controlled depending on the operating conditions being encountered at any given point in time. Be that as it may, FIG. 1 depicts a suitably sized and shaped weigh hopper 12 that contains an inventory of a particulate catalyst material 14. A support system 16 for the weigh hopper 12 is shown provided with a weighing device 18 such as load cells or scales. The weighing device 18 is preferably connected to a weigh indicator 20 such as a digital display 22. In this particular catalyst addition system, the weighing device 18, in effect, weighs both the weigh hopper 12 and the catalyst inventory 14 contained in said hopper in order to establish how much catalyst is actually being used. For example, the weigh indicator 20 can be adapted to display the combined weight of the weigh hopper 12 and catalyst inventory 14, and then subtract this combined weight from a combined weight of the hopper and catalyst inventory at some previous point in time. In the alternative, the empty weight of the weigh hopper 12 can be automatically subtracted from the combined weight of the weigh hopper 12 and catalyst inventory 14 so that a read-out display 22 of the weigh indicator 20 shows only the weight of the catalyst inventory 14.

In any case, in one particularly preferred embodiment of this invention, fresh catalyst from a source (not shown in FIG. 1) is added to the catalyst inventory 14 via a hopper loading valve 26 and catalyst injection pipe 28. Input of such fresh catalyst into the hopper 12 is indicated by arrow 24. The catalyst injection pipe 28 might also serve as a hopper venting system through use of an appropriate hopper vent valve 30 (which is preferably equipped with a silencer device 32). In any case, the weighing device 18 will detect changes in the weight of the catalyst inventory 14 over time as catalyst is taken from the weigh hopper 12 and introduced into a FCC unit (not shown in FIG. 1) by means of the valve systems of this patent disclosure. This "weigh information" may—via a computer associated with the control system—be used to modify the flow of catalyst 14 through the hereindescribed valve device which is generally depicted as item 56 at the bottom of the weigh hopper 12.

Plant air 34 (preferably, a stream of air delivered at pressures ranging from about 10 to about 100 psig) is delivered to the catalyst addition apparatus 10 via an air conduit system 36 such as the flexible hose and pipe system depicted in FIG. 1. The air conduit system 36 also is most preferably provided with various valves, e.g., valves 38, 40, 42, 44 and 46 in order to provide a means for distributing the plant air 34 to various parts of the catalyst addition apparatus 10. The air conduit system 36 also is preferably provided with a pressure gauge 48 and pressure gauge 50 for respectively measuring the air pressure outside and inside the weigh hopper 12. In any case, one of the main functions of the plant air 34 is to entrain the catalyst 14 and transfer it to a FCC unit. To this end, an air line 52 (especially one provided with a non-return valve 54) carrying a plant air stream 34 will most preferably pass under the weigh hopper 12.

The bottom of the weigh hopper 12 is shown provided with a valve device 56 made according to the teachings of this patent disclosure. Such a valve also may have an automatic/manual flow control selector 58 for automatically and/or manually controlling the entrainment of catalysts 14 into a high pressure stream of air 59 so that catalyst 14 in particulate form can be withdrawn from the bottom of the weigh hopper 12 and entrained in the air stream of high pressure air 59 when valve 56 is opened (e.g., automatically or manually). This catalyst flow can be aided by the fact that air pressure in the hopper 12 is made greater than the pressure of the stream of air 59 in which the catalyst particles 14 are to be entrained. In any case, a stream of high pressure air 59 containing the catalyst 14 is then directed into a FCC unit (not shown) via lines 60 and 62. Line 62 is preferably provided with a non-return valve 64 and ball valve 66 as indicated. Line 62 might also be provided with a metering indicator 68 to further check upon the function of the delivery system.

Again, the entrainment of particulate catalyst 14 into the stream of air 59 is preferably totally controlled by a valve device 56 made according to this patent disclosure, and which, in the case of FCC units, is most preferably regulated and monitored by a computer memory and control device 70 having a manual override capability. Such a computer memory and control device 70 will, in turn, be associated with those mechanical and electrical control and indicator devices normally associated with such processes in ways that are well known to the process control arts. For example, the memory and control device 70 may be associated with an air supply indicator 72, a valve indicator 74, a manual test button 76, a drain 78, an air supply 79, a remote input 80, a valve signal 82, a pneumatic control device 84, and an override indicator 86 such as those generally depicted in FIG. 1.

Figure 2:
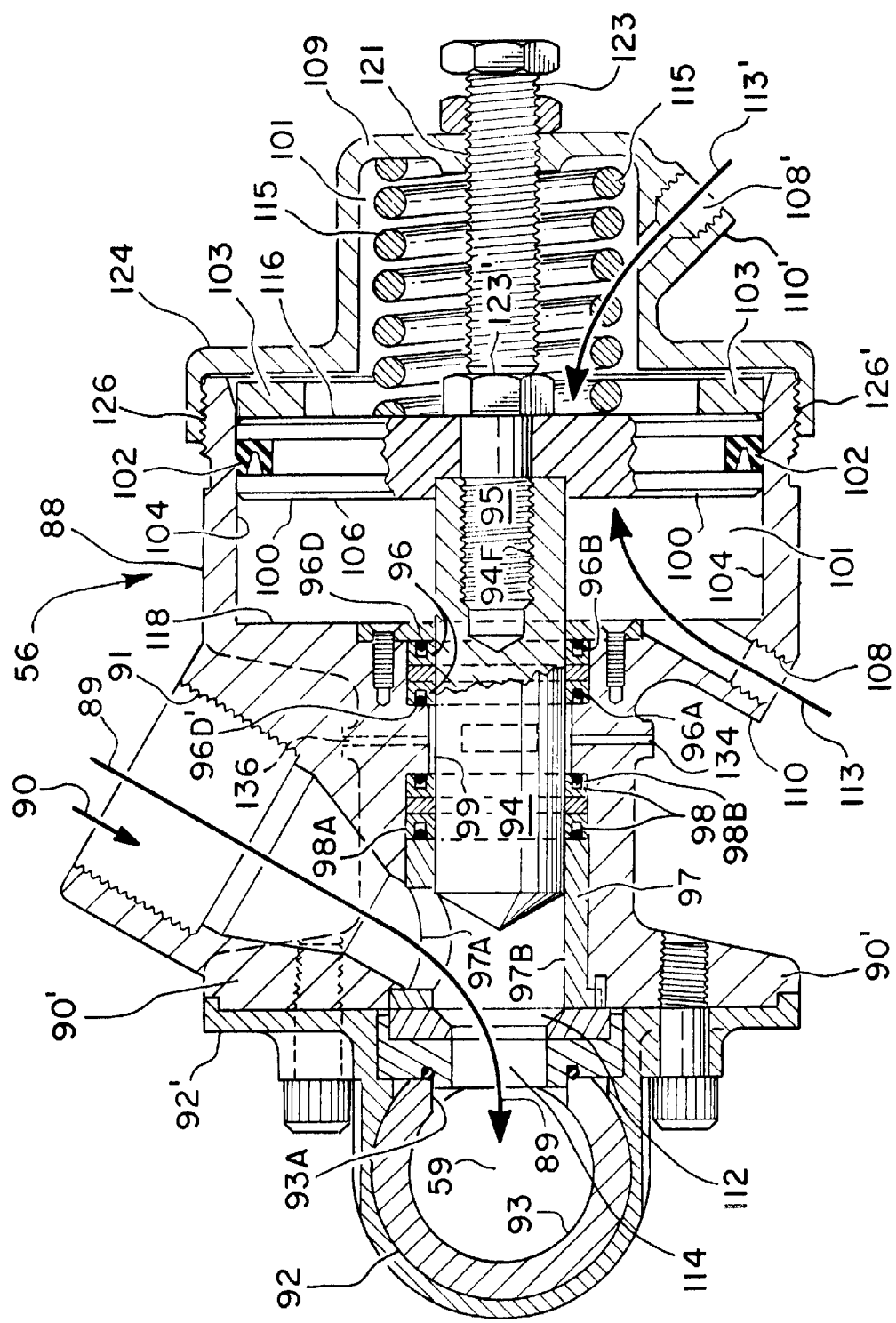
FIG. 2 is a detailed description of an assembled valve device made according to the teachings of this patent disclosure.

FIG. 2 is a cut-away view of a valve made according to the teachings of this patent disclosure. It is capable of being used in various ways, including in the manner generally shown in FIG. 1. In any case, FIG. 2 shows that such a valve 56, includes a valve body 88 that has several openings and passages. For example, it has a particulate material flow passage that is depicted by flow arrow 89 and through which particulate material moves from a particulate material storage vessel such the hopper 12 shown in FIG. 1 and into a stream of high pressure air such as the one suggested by flow arrow 59 in FIG. 1. This particulate material flow passage 89 preferably has a particulate material receiving port 90 for receiving particulate material into the valve body 88. This receiving port 90 will be in fluid communication with a particulate material outlet in a storage vessel, e.g., in the bottom of the catalyst hopper 12 shown in FIG. 1. This receiving port 90 also is in fluid communication with a particle entrainment gas flow tube 92 which is attached to (or, more preferably, formed as a part of) the valve body 88. This particle entrainment gas flow tube 92 carries a stream of high pressure gas such as air in the manner generally depicted by flow arrow 59 in FIG. 1. This gas flow tube 92 is shown disposed in a substantially perpendicular orientation with respect to the substantially vertically oriented bore 91 of the particulate material receiving port 90. Regardless of their orientation with respect to each other, the bore 91 of the particulate material flow port 90 and the bore 93 of the particle entrainment gas flow tube 92 are in fluid (e.g., air stream) communication with each other—if such communication is not prevented by a metering piston 94 positioned, adapted and arranged in a manner hereinafter more fully explained. For now, suffice it to say that, the metering piston 94 is adapted to seal off a portion of the particulate material flow passage 89 (e.g., the particulate material receiving port 90) in order to prevent catalyst particles in a storage vessel, such as the hopper 12 of FIG. 1, from passing through said receiving port 90 and into the bore 93 of particle entrainment gas flow tube 92.

Next it should be noted that the metering piston 94 is provided with two separate and distinct seals 96 and 98. Each seal serves to seal a portion of the metering piston 94, in a manner hereinafter more fully described, so as to prevent the intrusion of particulate material and/or air pressure around said seals 96 and 98 and into certain interior regions of the valve housing 88.

The metering piston 94 is rigidly connected to a drive piston 100 that is housed in the drive piston chamber 101. The drive piston 100 can be rigidly connected to the rear end of the metering piston 94 by various connecting rod devices 95 hereinafter more fully described. The drive piston 100 is provided with at least one drive piston seal 102. Drive piston seal 102 is in sealing engagement with the inside surface 104 of the drive piston chamber 101 which is either integral with, or connected to, the valve body 88. The lower surface 106 of drive piston 100 is in fluid communication with air pressure, depicted by flow arrow 113, from an air pressure source (not shown) through a bore opening 108 in an air flow tube 110. The air pressure source used to operate drive piston 100 via pressure delivered through air flow tube 110 may be separate and distinct from the air pressure source used to create the stream of high pressure air that travels through particle entrainment gas flow tube 92; or, the air pressure used to operate drive piston 100 and the stream of high pressure air traveling through particle entrainment gas flow tube 92 may be from the very same source (e.g., the plant air 34 depicted in FIG. 1). Regardless of its source, however, the high pressure air 113 delivered via air flow tube 110 to the lower surface 106 of the drive piston 100 should have a pressure that is sufficient to quickly force drive piston 100 "upward" i.e., toward the "top" 109 of the drive piston chamber 101.

It also should be understood that the drive piston 100 can be forced back toward the chamber wall 118 by other high pressure air 113' that is introduced into the bore 108' of a second high pressure air inlet 110' located near the top side 109 of the drive piston chamber 101. This introduction of high pressure air 113' will occur just after the drive piston reaches the highest point in its stroke (its closest position to the top side 109 of the drive piston chamber 101). Air flow devices for regulating the introduction of air into the first inlet 110 "under" the drive piston 100 (to the left of said piston) and into the second inlet 110' "above" the drive piston 100 (to the right of said piston) are not shown in FIG. 2, but are well known to the valve making and air flow regulation arts. This introduction of high pressure air 113' may be the sole means of forcing the drive piston back toward the chamber wall 118, or the force from this air pressure 113' may be used in addition to the force provided by the spring 115.

Since, the metering piston 94 and the drive piston 100 are rigidly connected to each other (via connector 95), when a burst of high pressure air enters air flow tube 110 and impinges on the lower surface 106 of drive piston 100, metering piston 94 will be "pulled out of" the particle entrainment air flow passage 89 e.g., the metering piston 94 will be pulled away from the particle entrainment air flow tube 92 . In a more specific embodiment of this invention, the metering piston 94 will be pulled out of both an opening in the metering piston sleeve and out of an opening 112 that, when not blocked or occupied by the metering piston 94, allows particle flow between the particulate material receiving port 90 and a particulate material exit port 114 that leads into particle entrainment gas flow tube 92. As was previously noted, this introduction of particulate material into this opening 112 (indeed, into the generalized particle stream 89) can be aided by placing the hopper 12 under a pressure that is greater than the pressure of the stream of air 59 in particle entrainment gas flow tube 92.

Next, it should be noted that the upward movement of drive piston 100 is shown being resisted by a spring 115 that is located between the top surface 116 of drive piston 100 and the top 109 of the drive piston chamber 101. This spring 115 provides a force that—when the air pressure introduced in the drive piston chamber 101 via inlet 110 is reduced or eliminated—quickly forces the drive piston 100 back to its original position near the chamber wall 118 that separates drive piston chamber 101 from metering piston chamber 99. Thus when this air pressure is so reduced or eliminated (by air flow interruption devices well known to this art, but not shown in FIG. 2), spring 115 forces drive piston 100 back toward the chamber wall 118.

There are two seals (96 and 98) in which metering piston 94 reciprocally moves. The first metering piston seal 96 is preferably positioned next to (or within a cavity of) the chamber wall 118 that generally separates the valve body 88 into two chambers, namely, its metering piston chamber 99 and its drive piston chamber 101. This first metering piston seal 96 can be a single unitary piece or it can be comprised of two or more seal elements such as the two seal elements 96A and 96B depicted in FIG. 2.

Those skilled in this art will appreciate that most seals of this kind are designed to primarily "face" (i.e., resist) pressure from one side. Therefore, seal elements 96A and 96B are most preferably mounted to face in opposite directions. For example, seal element 96B will "face" and resist air pressure from the drive piston chamber 101. Seal element 96A will "face" and resist the intrusion of any undesired particulate material that may find its way into those regions of the metering piston chamber 99 that generally lie between the two seals 96 and 98.

Regardless of whether it is comprised of one, two or more elements, the primary function of seal 96 is to prevent air leakage from the drive piston chamber 101 into the metering piston chamber 99. That is to say that seal 96 "faces" the chamber wall 118 and primarily serves to prevent air pressure from leaking out of the drive piston chamber 101 when the drive piston is being forced "upward" by high pressure air delivered to the lower surface 106 of the drive piston 100. The secondary function of seal 96 is to prevent any undesired particulate material (e.g., catalyst particles) that may find their way into metering piston chamber 99 from entering drive piston chamber 101.

The second metering piston seal 98 is situated between the particulate material flow passage 89 and the first metering piston seal 96. The primary function of this second metering piston seal 98 is to keep particulate material such as catalyst particles from entering certain internal regions in the valve body 88. To this end, seal 98 can be positioned to the rear of port 90 where the particulate material enters the valve body 88. That is to say that the second metering piston seal 98 is positioned somewhere between the flow passage 89 and the first seal 96. Most preferably, seal 98 faces toward air flow tube 92, and primarily serves to stop particulate matter (e.g., catalyst particles) from entering those regions of the metering piston chamber 99 to the right of the metering piston seal 98 depicted in FIG. 2. Seal 98 also is preferably (but not necessarily) comprised of two seals 98A and 98B). Seal 98A "faces" the particle material receiving port 90, in order to stop any leakage of catalyst or air into those regions of metering piston chamber 99 generally lying between seal 98 and seal 96. Seal 98B faces seal 96 and is designed to stop leakage of undesired particulate material that finds its way into the central regions of metering piston chamber 99 from working their way back toward the front end of the metering piston 94.

Figure 3A:
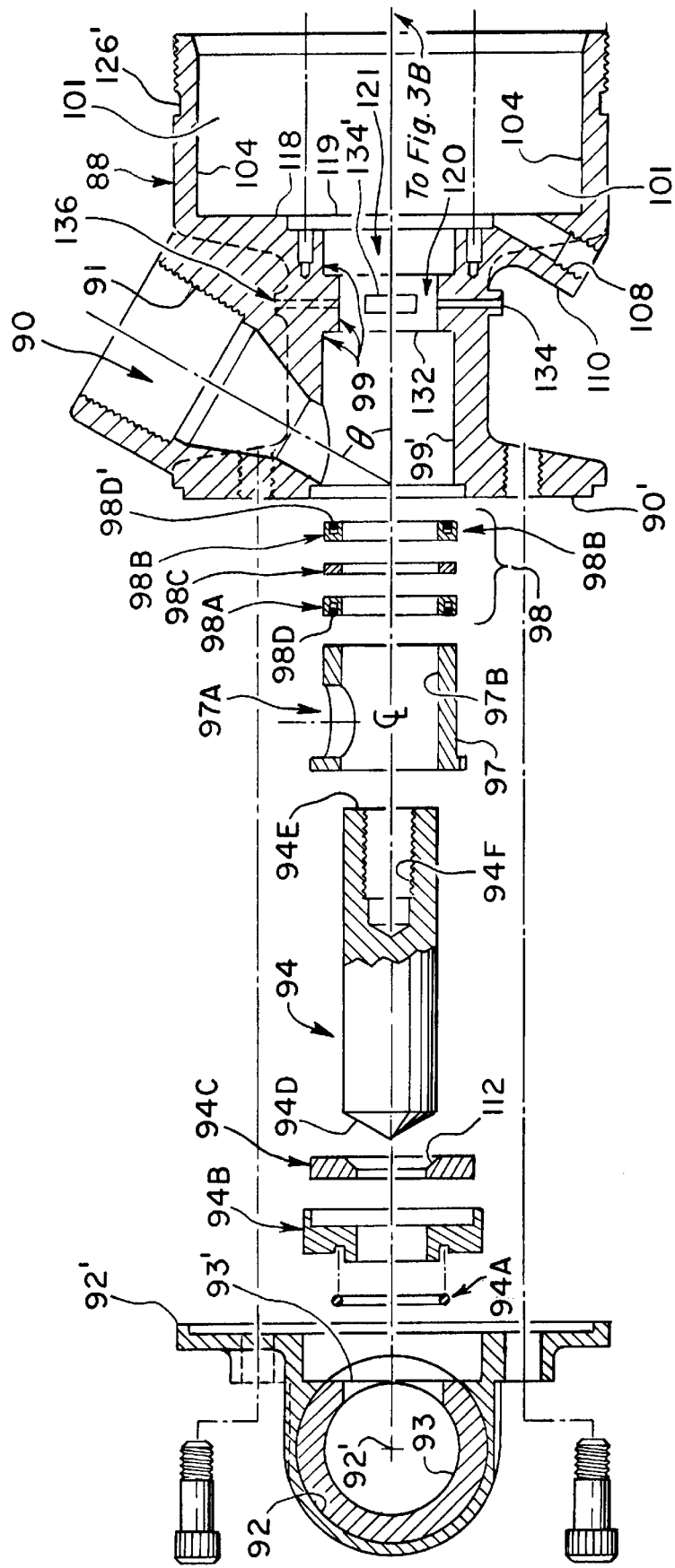
FIG. 3 depicts certain disassembled portions of the valve device shown in FIG. 2.

FIG. 3A is an exploded, cut-away, view of the left or "front" portions of the valve shown in FIG. 2. FIG. 3A also shows certain optional elements that for the sake of clarity were omitted from the assembled valve shown in FIG. 2. The valve body 88 includes a receiving port 90 for receiving particulate material to be pumped into particle entrainment air flow tube 92. This tube 92, may be a part of an air flow tube component 92' that is mechanically mounted (e.g., by bolts as suggested in FIG. 3) to the front end 90' of valve body 88. The bore 91 of particulate material receiving port 90 is shown positioned at an angle, theta that is substantially perpendicular to the center line of the valve body 88. The bore 91 of receiving port 90 also is substantially perpendicular to the center line 92' of the bore 93 of the particulate entrainment gas flow tube 92.

The metering piston 94 serves to (1) pump particulate material from the bore 91 of receiving port 90 to the bore 93 of particle entrainment gas flow tube 92 (with or without the aid of a positive pressure flowing from the hopper 12 to gas flow tube 92), or to, (2) block flow of particulate material between the bore 91 of the receiving port 90 and the bore 93 of particle entrainment gas flow tube 92. An opening 93' in the bore 93 of tube 92 permits particulate material to be pumped into, and entrained in, a stream of high pressure gas (such as air) traveling through the bore 93 of tube 92.

Figure 3B:
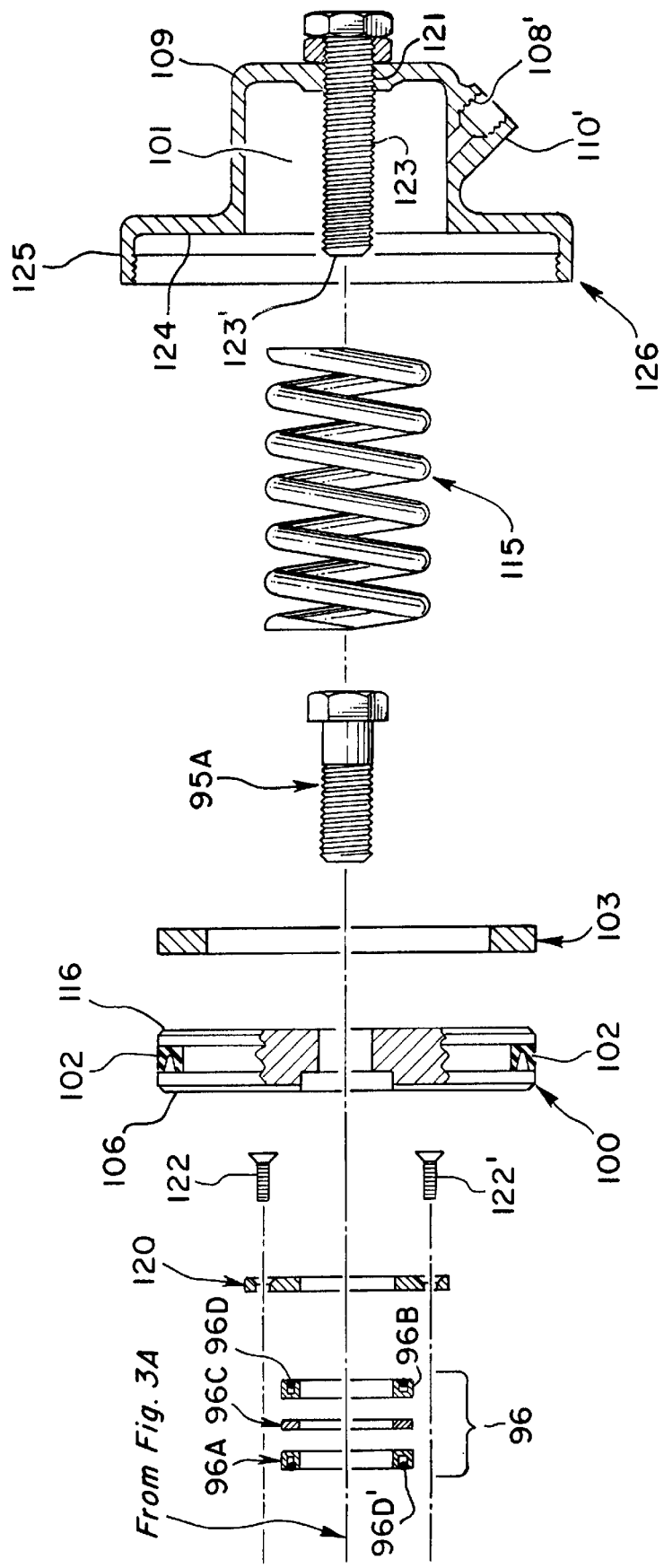

Various optional sealing and attaching devices can be associated with the bore 93 of gas flow tube component 92 in order to facilitate the particle pumping action supplied by metering piston 94. For example, FIG. 3 illustrates how an O-ring 94A, a support seal 94B and a metering piston nose seal 94C may be used to seal and guide the pumping action supplied by the nose 94D of the metering piston 94. Next, it should be noted that the rear end 94E of metering piston 94 is shown provided with a connecting means 94F (such as a threaded hole) for rigidly connecting the metering piston 94 to a connecting rod device 95 such as the threaded bolt 95A shown to the left of the spring 115 in FIG. 3B. Be this connection as it may, the metering piston 94 reciprocally moves in the bore of metering piston sleeve 97. This sleeve 97 is provided with a particulate material receiving port 97A. This metering piston sleeve 97 is preferably mounted in a metering piston sleeve holder region 99' which forms a part of the forward region of the drive piston chamber 99.

Continuing from FIG. 3A to FIG. 3B, one can see the cooperative features of the main components found in the drive piston chamber in an exploded view comparable to that employed in FIG. 3A. For example, the details of a preferred method of associating the drive piston 100 with a drive piston seal 102 are shown. The drive piston seal 102 is shown mounted on the circumference of the drive piston 100 in order to create an air pressure sealing engagement with the inside surface 104 of the drive piston chamber 101 shown in FIG. 2. Most preferably, the drive piston 100 is also provided with a bumper 103 that serves to protect the drive piston 100 and/or the drive piston seal 102 from impinging upon the inside surface 124 of the top 109 of drive piston chamber 101.

The lower surface 106 of drive piston 100 is in fluid (i.e., high pressure air) communication with a source of air pressure (not shown) via the bore 108 of the air flow tube 110 shown in FIG. 2. The air pressure entering air flow tube 110 serves to force the drive piston 100 toward the top 109 of the drive piston chamber 101. Since the drive piston 100 and the metering piston 94 are rigidly connected by a connecting rod device such as the bolt 95A shown in FIG. 3, the metering piston will be pulled away from the particle entrainment gas flow tube 92 (and away from any sealing or positioning devices e.g., O-ring 94A, support seal 94B, seal 94C) as the drive piston 100 is forced toward the top 109 of the drive piston chamber 101.

As was previously noted the drive piston 100 can be returned to its original "forward" position by any suitable mechanical means (e.g., air pressure, spring action, etc.). To illustrate this, FIG. 3 depicts a spring 115 that is positioned between the top surface 116 of drive piston 100 (or drive piston bumper 103) and the top 109 of the drive piston chamber 101. This spring 115 serves to force the drive piston 100 toward its original position lying near the chamber wall 118 that generally separates the valve body 88 into a metering piston chamber 99 and a drive piston chamber 101. The chamber wall 118 has a opening 120 through which a connector rod (e.g., bolt 95A) can reciprocally move as the drive piston 100 is driven "rearward" (toward the top 109 of the drive piston chamber 101) and "forward" toward the chamber wall 118. The chamber wall 118 may be provided with various auxiliary sealing devices known to this art e.g., the retainer seal 120 (and its retainer seal holding screws 122 and 122'). Preferably, the drive piston chamber 101 has a top housing portion 125 provided with an attachment device 126 (e.g., threads, lock rings, etc.) that serve to attach the top housing 125 to a cooperating attachment such as the attachment device 126' shown on the exterior surface of the drive piston chamber 101 in FIG. 2. Preferably, the top housing 125 also is provided with a threaded hole 121 through which a bolt 123 extends into the drive piston chamber 101. By this means, bolt 123 can be adjusted such that its end 123' can impinge upon, and hence define the height of the stroke of, the drive piston 100 as it nears the top 109 of the drive piston chamber 101.

As was noted in the discussion of FIG. 2, the seals 96 and 98 in which metering piston 94 reciprocally moves may be comprised of a single seal or a seal system having two or more elements. For example, seal 96 is shown in FIG. 3B as having two seal elements 96A and 96B that face in opposing direction. Again, the "facing" aspect of these seals implies facing the direction from which the gas pressure or particulate material primarily will come. This direction is depicted by a notch 96D of seal 96B that "faces" the top 109 of the drive piston chamber, while a notch 96D' of seal 96A "faces" the particle entrainment air flow tube 92. Seals 96A and 96B also may be separated by a seal spacer element 96C. Likewise, seal 98 in FIG. 3A is shown as being comprised of seals 98A and 98B separated by a seal spacer 98C. It also should be noted that even though FIG. 3B suggests that seal 96 be positioned on the right side of chamber wall 118, it is preferred that it actually be mounted in a receiving hollow 121 in the chamber wall 118. By way of comparison, FIG. 2 depicts that the most preferred location for seal 98 is against the rear wall 132 of the metering sleeve chamber 99' in the front region of metering piston chamber 99.

Referring back to FIG. 2, it also should be noted that the metering piston chamber 99 should be provided with at least one particulate material exhaust port 134 (and if desired a second such exhaust port 134') that serve(s) to expel, by an exhaust action, particulate material that does get past seal 98 (or seals 98A and 98B) and enters into the metering piston chamber 99. Preferably, this exhaust port 134 (and 134') lies between seals 96 and 98. Since ambient dust or other "undesired" particulate matter also may enter the metering piston chamber 99 via exhaust port 134, the two seal system (98A and 98B) suggested in FIG. 3 is a more preferred system since seal 98B faces the chamber wall 118 and will tend to prevent undesired particulate matter in the central regions of chamber 99 (i.e., those regions near exhaust port 134) from entering into the metering piston sleeve bore 97B. Conversely, seal 98A will serve to prevent particulate matter from entering the region of the drive piston chamber to the right of seal 98A. Normally, the reciprocally moving metering piston 94 will create enough turbulence in the metering piston chamber 99 to create an "exhaust action" that will serve to drive undesired particulate material out of the exhaust port 134. If need be, however, a fluid such as high pressure air or oil may be introduced (e.g., via an inlet 136) into the metering piston chamber in order to help "flush" undesired particulate material out of said metering piston chamber 99.

Those skilled in this art also will appreciate that while this invention generally has been described in terms of the general discussions, specific examples, drawings and preferred embodiments, none of these should be taken individually as a limitation upon the overall inventive concepts which are set forth in the following claims.

Thus having disclosed my invention, what is claimed is:

1. A valve for introducing particulate material into a high pressure stream of gas, said valve comprising:
    (a) a valve body having (1) a drive piston chamber and a metering piston chamber that are separated by a chamber wall having an opening that permits reciprocal motion of a connector rod that rigidly connects a drive piston mounted for reciprocal motion in the drive piston chamber to a metering piston mounted for reciprocal motion in the metering piston chamber; (2) a particulate material flow passage through which particulate material moves from a particulate material storage vessel into a stream of high pressure gas in which the particulate material is entrained, and (3) an undesired particulate material exhaust port that is located between a first metering piston seal and a second metering piston seal;
    (b) a drive piston mounted for reciprocal movement in the drive piston chamber, said drive piston (1) having a drive piston seal for holding air pressure delivered to said drive piston by at least one high pressure air source and (2) a connector device for rigidly connecting the drive piston to the connector rod;
    (c) a metering piston mounted for reciprocal movement within a metering piston sleeve and within two seals, said metering piston having (1) a generally cylindrical body capable of reciprocally moving in the metering piston sleeve and,in the two seals; (2) a front portion capable of blocking the particulate material flow passage when the metering piston is driven into said passage by the drive piston and (3) a rear end that is rigidly connected to the connector rod;
    (d) a metering piston sleeve that is mounted in a forward region of the metering piston chamber, said sleeve having a particulate material receiving port and a bore in which the metering piston reciprocally moves in order to pump particulate material into the stream of high pressure gas in which the particulate material is entrained;
    (e) a first metering piston seal having a front side that faces the drive piston chamber and thereby serving to prevent air pressure in the drive piston chamber from entering into the metering piston chamber; and
    (f) a second metering piston seal having a front side that faces the high pressure stream of gas into which the particulate material is entrained.

2. The valve of claim 1 wherein the drive piston is forced toward the chamber wall by a spring.

3. The valve of claim 1 wherein the drive piston is forced toward the chamber wall by a burst of high pressure air.

4. The valve of claim 1 wherein the stream of high pressure gas is comprised of a gas selected from the group consisting of air, nitrogen, carbon dioxide and hydrocarbon-based gas.

5. The valve of claim 1 wherein the particulate material entering the particulate material flow passage is under a pressure greater than the pressure of the stream of high pressure gas in which the particulate material is entrained.

6. The valve of claim 1 wherein a source of high pressure gas that is used to create the stream of high pressure gas into which the particulate material is entrained, is a source of high pressure air that also moves the drive piston.

7. The valve of claim 1 wherein a source of high pressure gas that is used to create the stream of high pressure gas into which the particulate material is entrained, is a different source of high pressure gas from that which moves the drive piston.

8. The valve of claim 1 wherein a fluid is injected into the metering piston chamber in a central region generally lying between the first metering piston seal and the second metering piston seal in order to flush out any undesired particulate material that finds its way into said metering piston chamber.

9. The valve of claim 1 wherein the first metering piston seal is comprised of two components wherein a first component is adapted to resist pressure from air injected into the drive piston chamber in order to force the drive piston away from the chamber wall and a second component is adapted to resist invasion of undesired particulate material from a central portion of the metering piston chamber into the drive piston chamber.

10. The valve of claim 1 wherein the second metering piston seal is comprised of two components wherein a first component is adapted to resist pressure from the stream of high pressure gas into which the particulate material is entrained, and a second component is adapted to resist invasion of undesired particulate material from a central portion of the metering piston chamber into the bore of the metering piston sleeve.

11. A valve for introducing particulate material into a high pressure stream of gas, said valve comprising:

(a) a valve body having (1) a drive piston chamber and a metering piston chamber that are separated by a chamber wall having an opening that permits reciprocal motion of a connector rod that rigidly connects a drive piston mounted for reciprocal motion in the drive piston chamber to a metering piston mounted for reciprocal motion in the metering piston chamber, (2) a particulate material receiving port for receiving particulate material into a metering piston sleeve mounted in the metering piston chamber so that the metering piston can pump said particulate material through the metering piston sleeve and into a stream of high pressure gas in which the particulate is entrained, (3) a particulate material exit port that is in fluid communication with both the particulate material receiving port and a particle entrainment gas flow tube that carries the stream of high pressure gas in which the particulate material is entrained, (4) a high pressure air receiving port for receiving high pressure air into the drive piston chamber in order to force the drive piston away from the chamber wall with a force sufficient to overcome a counter force created by a spring that serves to force the drive piston back toward the chamber wall; and (5) an undesired particulate material exhaust port that is located between a first metering piston seal and a second metering piston seal,;

(b) a drive piston that is mounted for reciprocal movement within the drive piston chamber, said drive piston having (1) a seal for holding air pressure provided by at least one high pressure air source that moves the drive piston, (2) a rear surface that comes into pressured contact with a spring positioned between the rear surface of the drive piston and a top surface of the drive piston chamber, (3) a connector for connecting the drive piston to one end of a rigid connector rod whose opposing end is connected to the metering piston via the opening in the chamber wall that separates the metering piston chamber from the drive piston chamber, said opening and said connector rod being so adapted and arranged that the connector rod can reciprocally move in said opening in the chamber wall and thereby pull the metering piston away from the particulate material exit port when high pressure air is injected into the drive piston chamber and, conversely, force the metering piston back toward the particulate material exit port when high pressure air is not injected into the drive piston chamber, and thereby allowing the spring in the drive piston chamber to force the drive piston back toward the chamber wall;

(c) a metering piston that is mounted for reciprocal movement within the metering piston sleeve, and within a first metering piston seal and a second metering piston seal, said metering piston having (1) a generally cylindrical body that is capable of reciprocally moving in the metering piston sleeve and in the first and second metering piston seals, (2) a front portion that is capable of preventing flow of particulate material between the particulate material receiving port and the particulate material exit port when the metering piston is driven into said exit port when the spring in the drive piston chamber forces the drive piston toward the chamber wall and (3) a rear portion that is rigidly connected to the connector rod;

(d) a metering piston sleeve that is mounted in the metering piston chamber such that the metering piston sleeve is positioned between the particulate material receiving port and the particulate material exit port, said metering piston sleeve having (1) a bore in which the metering piston reciprocally moves, (2) a metering piston sleeve opening through which particulate material from the particulate material receiving port enters the bore of the metering piston sleeve when the hole in the metering piston sleeve is opened by virtue of the fact that the metering piston is pulled away from the opening and (3) a bore that is sized such that the metering piston forms a cooperating fit with the bore that is such that the metering piston can reciprocally move within the metering sleeve bore, but which also is sized such that the particulate material being pumped by the valve can not enter a tolerance space between the bore of the metering piston sleeve and the metering piston, (e) a first metering piston seal having a front side that faces the drive piston chamber and a rear side that faces the metering piston chamber; and (f) a second metering piston seal, having a front side that faces the high pressure air stream into which the particulate material is entrained and a rear side that faces the chamber wall.

12. The valve of claim 11 wherein the high pressure stream of gas is comprised of a gas selected from the group consisting of air, nitrogen, carbon dioxide and hydrocarbon-based gas.

13. The valve of claim 11 wherein the particulate material entering the particulate material flow passage is under a pressure greater than the pressure of the stream of high pressure gas in which the particulate material is entrained.

14. The valve of claim 11 wherein a source of high pressure gas that is used to create the stream of high pressure gas into which the particulate material is entrained, is a source of high pressure air that also moves the drive piston away from the chamber wall.

15. The valve of claim 11 wherein a source of high pressure gas that is used to create the stream of high pressure gas into which the particulate material is entrained, is a different source of high pressure gas from that which moves the drive piston away from the chamber wall.

16. The valve of claim 11 wherein a fluid is injected into a central portion of the metering piston chamber that is located between the first seal and the second seal in order to flush out any undesired particulate material that finds its way into said central portion of the metering piston chamber.

17. The valve device of claim 11 wherein the first metering seal is comprised of two components wherein a first component is adapted to resist pressure from the air injected into the drive piston chamber in order to force the drive piston away from the chamber wall and a second component is adapted to resist invasion of undesired particulate materials from a central portion of the metering piston chamber into the drive piston chamber.

18. The valve device of claim 11 wherein the second metering piston seal is comprised of two components wherein a first component is adapted to resist pressure from the stream of high pressure air into which the particulate material is entrained and a second component is adapted to resist invasion of undesired particulate materials from a central portion of the metering piston chamber into the bore of the metering piston sleeve.

* * * * *

UNITED STATES PATENT AND TRADEMARK OFFICE
CERTIFICATE OF CORRECTION

PATENT NO : 5,810,045
DATED : September 22, 1998
INVENTOR(S): Martin Evans

It is certified that error appears in the above-identified patent and that said Letters Patent is hereby corrected as shown below:

Column 14, claim 1, line 14, please delete claim 1 and substitute therefore the following recitation of claim 1 --

1. A valve for introducing particulate material into a high pressure stream of gas, said valve comprising:

(a) a valve body having (1) a drive piston chamber and a metering piston chamber that are separated by a chamber wall having an opening that permits reciprocal motion of a connector rod that rigidly connects a drive piston mounted for reciprocal motion in the drive piston chamber to a metering piston mounted for reciprocal motion in the metering piston chamber; (2) a particulate material flow passage through which particulate material moves from a particulate material storage vessel into a stream of high pressure gas in which the particulate material is entrained, and (3) an undesired particulate material exhaust port that is located between a first metering piston seal and a second metering piston seal for venting particulate material therebetween and preventing such

UNITED STATES PATENT AND TRADEMARK OFFICE
CERTIFICATE OF CORRECTION

PATENT NO : 5,810,045
DATED : September 22, 1998
INVENTOR(S): Martin Evans

It is certified that error appears in the above-identified patent and that said Letters Patent is hereby corrected as shown below:

particulate material from reaching said metering piston chamber or said drive piston chamber;

(b) a drive piston mounted for reciprocal movement in the drive piston chamber, said drive piston (1) having a drive piston seal for holding air pressure delivered to said drive piston by at least one high pressure air source and (2) a connector device for rigidly connecting the drive piston to the connector rod;

(c) a metering piston mounted for reciprocal movement within at least a portion of a metering piston sleeve and at least a portion of said valve body and along and within two seals within said at least portion of said metering piston sleeve and said at least portion of said valve body, said metering piston having (1) a generally cylindrical body capable of reciprocally moving along and within the metering piston sleeve and in the two seals; (2) a front portion capable of blocking the particulate material flow passage when the metering

UNITED STATES PATENT AND TRADEMARK OFFICE
CERTIFICATE OF CORRECTION

PATENT NO : 5,810,045
DATED : September 22, 1998
INVENTOR(S): Martin Evans

It is certified that error appears in the above-identified patent and that said Letters Patent is hereby corrected as shown below:

piston is driven into said passage by the drive piston and (3) a rear end that is rigidly connected to the connector rod;

(d) a metering piston sleeve that is mounted in a forward region of the metering piston chamber, said sleeve having a particulate material receiving port and a bore in which the metering piston reciprocally moves in order to pump particulate material into the stream of high pressure gas in which the particulate material is entrained;

(e) a first metering piston seal having a front side that faces the drive piston chamber and thereby serving to prevent air pressure in the drive piston chamber from entering into the metering piston chamber; and (f) a second metering piston seal, adjacent said at least portion of said metering piston sleeve and said exhaust port, having a front side that faces the high pressure stream of gas into which the particulate material is entrained serving to allow particulate material that escapes past said second metering piston seal to be vented through said exhaust port. --

UNITED STATES PATENT AND TRADEMARK OFFICE
CERTIFICATE OF CORRECTION

PATENT NO : 5,810,045
DATED : September 22, 1998
INVENTOR(S): Martin Evans

It is certified that error appears in the above-identified patent and that said Letters Patent is hereby corrected as shown below:

Column 15, claim 11, line 35, please delete claim 11 and substitute therefore the following recitation of claim 11 --

11. A valve for introducing particulate material into a high pressure stream of gas, said valve comprising:

(a) a valve body having (1) a drive piston chamber and a metering piston chamber that are separated by a chamber wall having an opening that permits reciprocal motion of a connector rod that rigidly connects a drive piston mounted for reciprocal motion in the drive piston chamber to a metering piston mounted for reciprocal motion in the metering piston chamber, (2) a particulate material receiving port for receiving particulate material into a metering piston sleeve mounted in the metering piston chamber so that the metering piston can pump said particulate material through the metering piston sleeve and into a stream of high pressure gas in which the particulate is entrained, (3) a particulate material exit port that is in fluid communication with both the particulate material receiving port and a particle entrainment gas flow tube that carries the stream

UNITED STATES PATENT AND TRADEMARK OFFICE
CERTIFICATE OF CORRECTION

PATENT NO : 5,810,045
DATED : September 22, 1998
INVENTOR(S): Martin Evans

It is certified that error appears in the above-identified patent and that said Letters Patent is hereby corrected as shown below:

of high pressure gas in which the particulate material is entrained, (4) a high pressure air receiving port for receiving high pressure air into the drive piston chamber in order to force the drive piston away from the chamber wall with a force sufficient to overcome a counter force created by a spring that serves to force the drive piston back toward the chamber wall; and (5) an undesired particulate material exhaust port that is located between a first metering piston seal and a second metering piston seal for venting particulate material therebetween and preventing such particulate material from reaching said metering piston chamber or said drive piston chamber;

(b) a drive piston that is mounted for reciprocal movement within the drive piston chamber, said drive piston having (1) a seal for holding air pressure provided by at least one high pressure air source that moves the drive piston, (2) a rear surface that comes into pressured contact with a spring positioned between the rear surface of the drive piston and a

UNITED STATES PATENT AND TRADEMARK OFFICE
CERTIFICATE OF CORRECTION

PATENT NO : 5,810,045
DATED : September 22, 1998
INVENTOR(S): Martin Evans

It is certified that error appears in the above-identified patent and that said Letters Patent is hereby corrected as shown below:

top surface of the drive piston chamber, (3) a connector for connecting the drive piston to one end of a rigid connector rod whose opposing end is connected to the metering piston via the opening in the chamber wall that separates the metering piston chamber from the drive piston chamber, said opening and said connector rod being so adapted and arranged that the connector rod can reciprocally move in said opening in the chamber wall and thereby pull the metering piston away from the particulate material exit port when high pressure air is injected into the drive piston chamber and, conversely, force the metering piston back toward the particulate material exit port when high pressure air is not injected into the drive piston chamber, and thereby allowing the spring in the drive piston chamber to force the drive piston back toward the chamber wall;

(c) a metering piston that is mounted for reciprocal movement within at least a portion of the metering piston sleeve and at least a portion of said valve body, and along and within a first metering piston seal and a second metering piston seal

UNITED STATES PATENT AND TRADEMARK OFFICE
CERTIFICATE OF CORRECTION

PATENT NO : 5,810,045
DATED : September 22, 1998
INVENTOR(S): Martin Evans

It is certified that error appears in the above-identified patent and that said Letters Patent is hereby corrected as shown below:

within said at least portion of said metering piston sleeve and said at least portion of said valve body, said metering piston having (1) a generally cylindrical body that is capable of reciprocally moving along and within the metering piston sleeve and in the first and second metering piston seals, (2) a front portion that is capable of preventing flow of particulate material between the particulate material receiving port and the particulate material exit port when the metering piston is driven into said exit port when the spring in the drive piston chamber forces the drive piston toward the chamber wall and (3) a rear portion that is rigidly connected to the connector rod;

(d) a metering piston sleeve that is mounted in the metering piston chamber such that the metering piston sleeve is positioned between the particulate material receiving port and the particulate material exit port, said metering piston sleeve having (1) a bore in which the metering piston reciprocally moves, (2) a metering piston sleeve opening through which particulate material from the particulate material receiving

UNITED STATES PATENT AND TRADEMARK OFFICE
CERTIFICATE OF CORRECTION

PATENT NO : 5,810,045
DATED : September 22, 1998
INVENTOR(S): Martin Evans

It is certified that error appears in the above-identified patent and that said Letters Patent is hereby corrected as shown below:

port enters the bore of the metering piston sleeve when the hole in the metering piston sleeve is opened by virtue of the fact that the metering piston is pulled away from the opening and (3) a bore that is sized such that the metering piston forms a cooperating fit with the bore that is such that the metering piston can reciprocally move within the metering sleeve bore, but which also is sized such that the particulate material being pumped by the valve can not enter a tolerance space between the bore of the metering piston sleeve and the metering piston, (e) a first metering piston seal having a front side that faces the drive piston chamber and rear side that faces the metering piston chamber; and (f) a second metering piston seal, adjacent said at least portion of said metering piston sleeve and said exhaust port, having a front side that faces the high pressure air stream into which the particulate material is entrained and a rear side that faces the chamber wall and serving to allow

UNITED STATES PATENT AND TRADEMARK OFFICE
CERTIFICATE OF CORRECTION

PATENT NO : 5,810,045
DATED : September 22, 1998
INVENTOR(S): Martin Evans

It is certified that error appears in the above-identified patent and that said Letters Patent is hereby corrected as shown below:

particulate material that escapes past said second metering piston seal to be vented through said exhaust port. --

Signed and Sealed this

Sixteenth Day of March, 1999

Q. TODD DICKINSON

Attest:

Attesting Officer

Acting Commissioner of Patents and Trademarks